Figures 1, 2, 3:
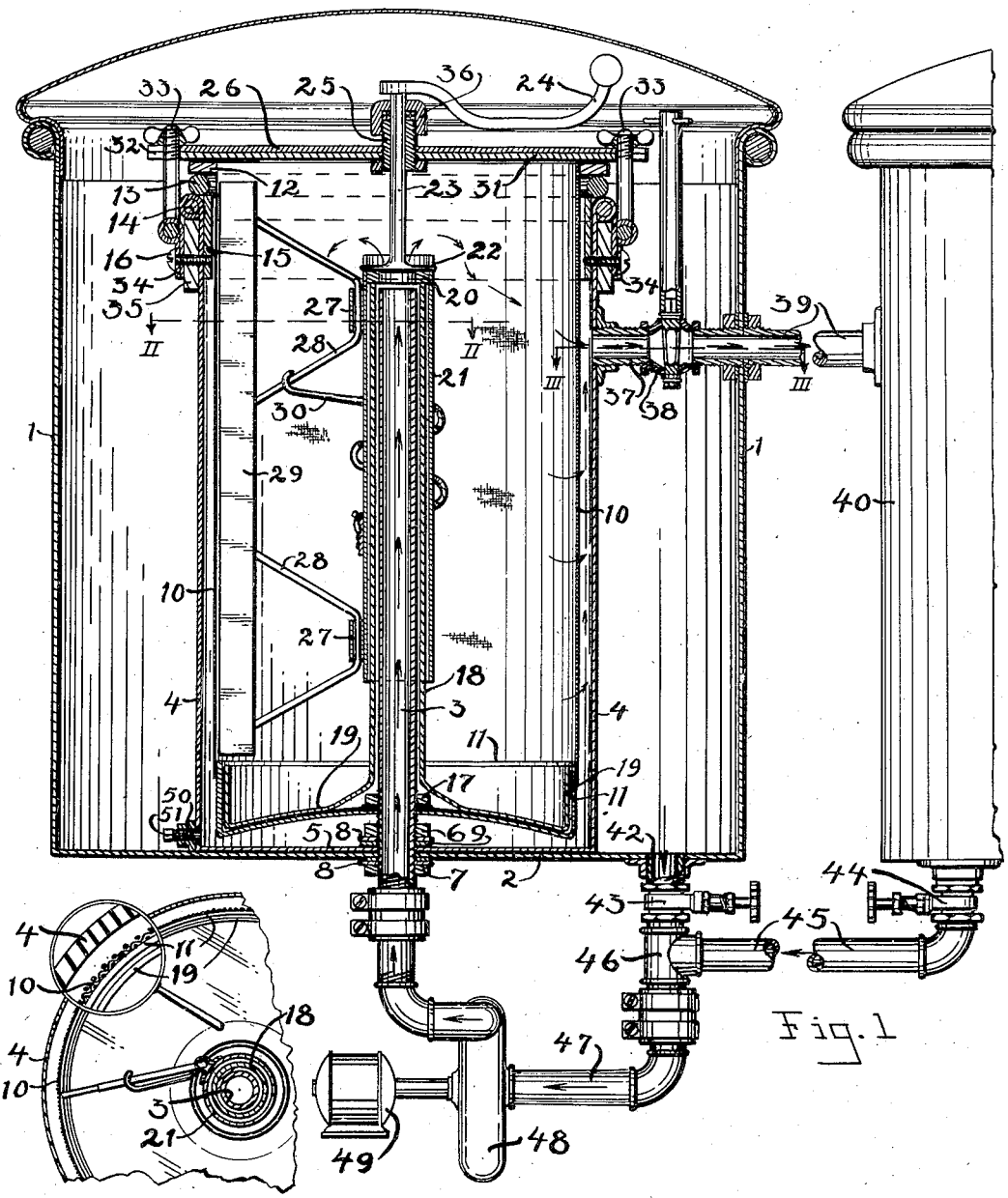

Dec. 17, 1935.  S. MALANOWSKI  2,024,463

PRESSURE SOLVENT FILTER

Filed Dec. 23, 1933

Stanley Malanowski
Inventor

By Arthur Winnick
Attorney

Patented Dec. 17, 1935

2,024,463

UNITED STATES PATENT OFFICE 2,024,463

PRESSURE SOLVENT FILTER

Stanley Malanowski, Tampa, Fla.

Application December 23, 1933, Serial No. 703,793

8 Claims. (Cl. 210—43)

The present invention relates to improvements in apparatus for clarifying liquids used in dry cleaning of textiles and clothing, and has for its primary object the provision of a simple, compact, efficient, and inexpensive device adapted for use in connection with a washer of any of the well-known types, to produce a relatively small dry cleaning system of such low initial cost as to bring it within the economical use of establishments having a limited trade. It will of course be understood that the invention is not limited to small sized apparatus, since larger sizes are equally efficient, and the apparatus may readily be adapted to the needs of large establishments.

A further object of the invention is to provide a pressure filter and pump by means of which a continuous stream of clarified cleansing fluid may be run into the washer upon the material being cleaned while a similar stream flows out of the washer to the filter carrying with it absorbed and dissolved oils, greases, and other substances soluble in the dry cleaning mixture, as well as lint, and other solid dirt in suspension, the filter comprising a screen carrying upon its inner surface a layer of adsorbing and decolorizing material such as fuller's earth, diatomaceous earth, talc, and activated carbon, or any similar porous substance or mixture of substances having the property of taking up the oils and greases and preventing the passage of solid impurities, this arrangement affording a continuous cyclic operation with a minimum number of parts.

Another object of the invention is to make the apparatus a self-contained unit with the filter chamber mounted within the storage tank, the conduits and valves being arranged to provide for the flow of liquid at will either to the washer or to the storage tank, whereby the cleaning fluid may be removed completely from the washer into the storage tank and circulated from the tank through the filter for purification to be ready for its next use.

Further objects of the invention include simplified means for removing solids from the surface of the filter screen and for removing solids from the filter chamber.

For the purpose of illustration, a specific example of a preferred embodiment of the invention is shown in the accompanying drawing, in which Figure 1 is a sectional view taken vertically through the center of the storage tank and filter chamber, with a portion of a washer indicated in elevation at one side of the tank; Fig. 2 is a fragmentary horizontal section through the filter chamber on the line II—II of Fig. 1; and Fig. 3 is a fragmentary horizontal section on the line III—III of Fig. 1.

The storage tank 1 is shown as provided with an opening in the center of the bottom 2 for the passage of a pipe 3. An inner filter tank 4 also has an opening in its bottom 5 for the passage of the pipe 3 which is firmly clamped in place by nuts 6 and 7, washers 8 and gaskets 9 aiding in forming a liquid tight joint where the pipe enters the tanks. Suspended within the inner tank 4 is a cylindrical metallic filter screen 10 having a very fine mesh, the lower end of the screen being soldered, brazed, or welded to a pan-like solid sheet metal bottom 11, shown as dished upwardly around the pipe 3. The top of the screen 10 is secured to an annular flange 12 which rests upon a gasket 13. This gasket is supported by the rolled rim 14 of the tank 4 and by a reinforcing band 15 secured within the upper end of the tank as by screws 16. A nut 17 on the pipe 3 serves to draw the screen assembly downward to hold the flange in close engagement with the gasket to seal the top of the space between the tank 4 and the screen 10.

Slidable vertically upon the upper portion of the pipe 3 is a pipe 18, the lower end of which is fastened to the central portion of a pan-like sludge trap 19 which fits closely within the sheet metal bottom member 11, the pipe 18 serving as a handle to lift the trap vertically out of the screen when it is desired to remove the solid matter from the filter.

Upon the upper end of pipe 18 rests a sleeve 20 secured within a pipe 21 notched at its upper end to receive the arms 22 of a crank pin 23 mounted for rotation by a handle 24 within a tube 25 secured upon the top or lid 26. Upon the pipe 21 are a pair of brackets 27 for the pivotal mounting of arms 28 which carry a scraper 29 at their outer ends. A spring 30 surrounding the pipe 21 and secured thereto at one end, bears with its other end against one of the arms 28 to swing the scraper on the pivots of the arms into contact with the inner surface of the screen 10. Rotation of the crank handle 24 will cause rotation of the pipe 21 around its axis, and because of the eccentric mounting of the arms, shown in Fig. 2, the spring 30 will hold the scraper 29 in close but yielding contact with the screen.

The lid 26 has a gasket 31 on its lower surface resting on the top of the flange 12, and is notched as at 32, to receive bolts 33 pivoted on brackets 34 and having wing nuts to engage the upper surface of the lid to hold it clamped tightly on the flange 12. The brackets 34 are secured to a reinforcing band 35 on the outside of the tank 4 and to the reinforcing band 15 by the screws 16. The crank pin 23 is provided with a stuffing box 36 to prevent the escape of liquid from the filter chamber around the pin.

The arrangement described makes the space within the screen a chamber completely closed except between the meshes of the screen and the inlet opening at the upper end of the pipes 3, 18, and 21, where the liquid may enter at each side of the pin 23. The tank 4, as shown is preferably of sheet metal, forming a chamber closed at the top by the lid, screen flange and gaskets and having at one side a discharge outlet through pipe 37 having two discharge connections controlled by a three-way valve 38, shown in Fig. 1 as opened to permit the liquid to flow from the valve through a pipe 39 leading to the washer 40, and as shown in Fig. 3, when the valve is turned through a quarter turn, the liquid will flow from the valve through a pipe 41 into the space between the tank 4 and the tank 1.

The tank 1 has a bottom outlet 42 controlled by a valve 43, and the washer 40 has a bottom outlet controlled by a valve 44. A pipe 45 connects the valve 44 with a T 46 which is also connected with the valve 43. From the T 46, a pipe 47 leads to a pump 48 which delivers liquid to its discharge line, the vertical pipe 3, discharging directly into the interior of the filter screen 10. A motor 49 drives the pump.

It will be seen that with the valve 38 set to deliver liquid to the pipe 39 and the washer 40, and with the valve 44 open and the valve 43 closed, operation of the pump will draw fluid out at the bottom of the washer, force it into the filter chamber through the pipe 3, through the screen 10 into the tank 4 and out of the tank outlet pipe through valve 38 and pipe 39 back to the washer 40. This will be the normal setting during the operation of cleaning clothing in the washer.

Turning the valve 38 to the position shown in Fig. 3, with the valve 44 still open and valve 43 closed, the liquid will be withdrawn from the washer, and passed through the screen into the storage space in the tank 1. When all the liquid has left the washer, the valve 44 may be closed and the valve 43 opened to allow the pump to circulate the liquid from the storage chamber through the filter and back to storage.

This will be the setting at the beginning of operations when new solvent liquid is placed in the storage tank, or when dirty solvent is placed in the tank for clarification, or the tank has been cleaned of collected impurities, or when adsorbing powder has been placed within the tank to prepare a filter surface.

The present apparatus is particularly intended to be used with a powdered filtering material such as fuller's earth, diatomaceous earth, and activated carbon, introduced into the liquid in the storage tank, stirred up, and deposited as the liquid is forced through the screen, as a thin, porous, highly adsorbent film or thin layer upon the entire inner surface of the screen 10 which will preferably be made of the very fine, close-meshed, wire fabric specially woven for filters and capable of retaining the powdered material in a layer that is so dense and fine that it will prevent even coloring matter from passing through while it will adsorb and take up oils, greases, and even certain unsaturated hydrocarbons present in the ordinary commercial cleaning fluids, leaving the liquid that permeates the film thoroughly clarified and in proper condition for further solvent action. After a certain time, the dirt and foreign matter removed from the articles being cleaned will collect inside the filter and finally interfere with its rapid operation. With the valves set to cause the liquid to pass through the filter and into the storage tank, the crank handle 24 may be turned around to operate the scraper blade 29 to loosen the adhering solid matter from the screen. Since it is heavier than the solvents, it will sink down into the trap 19 within the solid lower portion of the screen chamber. Some of the filtering material and dirt may pass through the screen into the tank 1 because of the mechanical disruption of the film, but when another charge of the powdered filtering material is placed within the liquid in the tank, and is carried with the liquid through the pump into the screen chamber, a new layer will be formed on the inner surface of the screen which will retain all impurities and only a short period of pumping the liquid in the closed cycle or circuit from storage through the filter will be needed before the liquid coming from the filter will again be entirely clear ready to be passed into the washer.

New solvent may be introduced at any time into the tank 1, or into the washer if so desired, to replace losses such as unavoidably occur in removing cleaned articles from the washer.

Occasionally, depending upon the nature of the material cleaned and the amount of dirt that may be dislodged, it will be necessary to remove the trap 19 with its contents. After the bolts 33 are unfastened and swung out of engagement with the lid, the lid may be removed carrying with it the crank pin 23. The pipe 21 may be taken out with the scraper pivoted thereto, leaving the pipe 18 free to slide upward off the pipe 3 carrying with it the attached trap 19 secured to the lower end of the pipe 18. As this operation will be performed only after considerable use of the prepared filter layer and after the scraper has been used to clean the inside of the screen, the upper rim of the trap 19 will do no harm even if it scrapes against the screen. After cleaning out the trap, it will be replaced, the pipe 21 slid down over the pipe 18, the lid 26 set back with the arms 22 of the crank pin engaging the notches in the upper end of the pipe 21, the clamp bolts 33 swung into place and tightened, a new charge of filter powder placed in the storage tank, and the pump started to rebuild the filter layer upon the inside of the screen 10.

While the solvent liquid is being forced through the open meshes of the screen at the beginning of the process of depositing the adsorbing layer, some of the very fine powder may pass before the meshes become closed and settle downward where the liquid currents are slow, particularly around the solid sheet metal portion 11 and beneath the upwardly dished central portion of the bottom around the pipe 3. An outlet opening 50, shown in Fig. 1, is provided as a passage permitting the flushing out of this sediment after the filter layer has become impervious to solids. Upon removal of the plug 51, with both discharge openings controlled by the valve 38 completely closed, and with valve 43 open, the liquid passing through the filter under pressure will be forced out through the port 50 into the storage tank carrying with it the loose sediment in suspension to be carried out of the storage tank through the valve 43 into the filter again with all meshes closed, the cycle of filtration being continued until the solvent is clear. As soon as the liquid is free from sediment, the valve 38 may be turned to allow it to leave the filter chamber either to the washer or to the storage chamber, and the plug 51 will then be replaced.

It will be noted that the top of the pipe 3 is near the lid and higher than the outlet 37, so that there will be no tendency for liquid pumped out of the washer to flow back even if the valve 44 is inadvertently left open. If the pipe extended only into the bottom of the filter chamber, the liquid might return to the washer when the pump stopped if the valve 44 were not immediately closed.

The gasket 31 is preferably made of a compressed fiber board of a density that will permit escape of air from the space in the top of the filter chamber above the outlet 37 but which will allow only very slow passage of liquid. Any solvent that might escape through the gasket will merely flow into the storage chamber, which will not matter, and there are advantages in having the air all out of the filter chamber. The gasket 13 may flatten out after use, but the nut 17 can then be screwed down against the upwardly dished bottom of the solid sheet metal portion 11 which will tend to spread outward as it is pressed down so that the suspended screen will be stretched tight in a true cylindrical form to act as a rigid support for the filter layer, and which will be smooth for efficient action of the scraper.

Many other desirable features of the device will be apparent to those familiar with the art, and it will be evident that the novelty is not confined to the specific details illustrated herein, but that many changes in construction and arrangement of parts may be made within the scope of what is claimed without departing from the spirit of the invention or losing its advantages.

I claim:

1. An apparatus for purification of solvent liquids which comprises a storage tank, a pump, and a pressure filter enclosed in said storage tank, a discharge line from the pump communicating with the interior of the filter, an intake line for the pump having two intake connections connected therewith and means whereby the intake line may be connected with one or the other of the intake connections, one of said intake connections receiving liquid from the storage tank, and the other receiving liquid from a source other than the tank, and the filter having a discharge outlet and means whereby liquid leaving the filter may be directed to one or the other of two discharge connections, one of said discharge connections communicating with the storage tank and the other of said discharge connections communicating with a receptacle other than the storage tank.

2. A unit of the character described comprising a storage tank, a filter tank forming a closed chamber within the storage tank, a filter within the filter tank, an inlet for the reception of liquid to be filtered communicating with the interior of the filter, and an outlet from the filter tank having two discharge connections, and means whereby liquid leaving the filter may be directed to one or the other of said discharge connections, one of said discharge connections leading into the storage tank, and the other of said discharge connections leading to a point outside of the storage tank.

3. A filter unit comprising a storage tank, a filter tank within the storage tank, a filter screen within the filter tank adapted to retain adsorbent solids upon its inner surface to form a filter layer, and a pump having a discharge line leading to the interior of the filter screen, the storage tank having a discharge outlet adapted for connection with the pump, the filter tank having an outlet near its bottom for the discharge of sediment into the storage tank, a closure for the said outlet, the filter tank also having a discharge outlet at a point considerably above its bottom provided with two discharge connections, means whereby liquid leaving the said discharge outlet may be directed to one or the other of the two discharge connections, one of the said discharge connections leading into the storage tank and the other leading out of the storage tank, and the pump having two intake connections, and means whereby the pump may be connected with one or the other of said intake connections, one of said intake connections being adapted to receive liquid from the discharge outlet of the storage tank, and the other of said intake connections receiving liquid from a source other than the storage tank.

4. An apparatus for purification of solvent liquids comprising a pump, a washer, a filter, and a storage tank, a discharge line from the pump communicating with the interior of the filter, an intake line from the pump having two intake connections, one of said intake connections receiving liquid from the washer, the other of said intake connections receiving liquid from the storage tank, means whereby the intake line may be connected with one or the other of the said intake connections, and the filter having a discharge outlet communicating with two discharge connections, one of said discharge connections leading into the washer and the other of said discharge connections leading into the storage tank, and means whereby liquid leaving the filter may be directed to one or the other of said discharge connections independent of the setting of the intake connections of the pump, whereby liquid drawn from the washer by the pump may be returned to the washer or delivered to the storage tank, and whereby liquid drawn from the storage tank by the pump may be returned to the storage tank or delivered to the washer.

5. A filter unit of the character described comprising a filter tank having an upper rim adapted to receive a gasket, a gasket upon said rim, a filter screen within said tank and separated therefrom to form a chamber around said screen and having an outwardly directed flange at its upper margin resting on said gasket, the tank and the screen each having a bottom perforated to receive a pipe, a pipe passing through the perforated bottom of the tank and screen, the pipe being secured to the bottom of the tank and having a screw-threaded portion and a nut thereon above the bottom of the screen, said nut being adjustable on the pipe to draw the screen downward to clamp its flange on the gasket on the rim of the tank, the screen being substantially cylindrical and the bottom of the screen being of solid metal upwardly convexed.

6. A structure as in claim 5, in which the filter tank has a lid, a fibrous gasket beneath the lid resting upon the flange of the screen, and means to clamp the lid and tank together.

7. A filter unit comprising a cylindrical filter screen having an axial tubular inlet, and a tube surrounding the tubular inlet and slidably mounted thereon, said tube having secured at its lower end an annular sludge pan to receive solid matter from the screen.

8. A structure as in claim 7 having a tube rotatably mounted on the sluge pan tube and carrying a scraper to engage the inner surface of the screen when the scraper tube is rotated.

STANLEY MALANOWSKI.